(12) United States Patent
Stinebring et al.

(10) Patent No.: US 10,464,590 B2
(45) Date of Patent: Nov. 5, 2019

(54) STEERING COLUMN ENERGY ABSORBING SYSTEM

(71) Applicant: STEERING SOLUTIONS IP HOLDING CORPORATION, Saginaw, MI (US)

(72) Inventors: Scott A. Stinebring, Auburn, MI (US); Robert D. Maida, Pinconning, MI (US); Brandon M. McComb, Burton, MI (US); Nicholas M. Messing, Freeland, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 120 days.

(21) Appl. No.: 15/688,329

(22) Filed: Aug. 28, 2017

(65) Prior Publication Data
US 2018/0099687 A1     Apr. 12, 2018

Related U.S. Application Data

(60) Provisional application No. 62/405,339, filed on Oct. 7, 2016.

(51) Int. Cl.
*B62D 1/19* (2006.01)
*B62D 1/181* (2006.01)
*B62D 1/185* (2006.01)

(52) U.S. Cl.
CPC ............. *B62D 1/192* (2013.01); *B62D 1/181* (2013.01); *B62D 1/185* (2013.01); *B62D 1/195* (2013.01)

(58) Field of Classification Search
CPC .......... B62D 1/19; B62D 1/192; B62D 1/181; B62D 1/185; B62D 1/195
USPC ......................................................... 74/493
See application file for complete search history.

(56) References Cited

U.S. PATENT DOCUMENTS

| | | | | |
|---|---|---|---|---|
| 3,501,993 A | | 3/1970 | Swenson | |
| 3,719,255 A | * | 3/1973 | Daniels | B62D 1/192 188/372 |
| 4,142,423 A | * | 3/1979 | Ikawa | B60R 22/28 188/374 |
| 5,082,311 A | * | 1/1992 | Melotik | B62D 1/195 188/371 |
| 5,375,881 A | * | 12/1994 | Lewis | B62D 1/192 188/374 |

(Continued)

FOREIGN PATENT DOCUMENTS

| | | |
|---|---|---|
| CN | 105946959 A | 9/2016 |
| CN | 105980236 A | 9/2016 |
| JP | 2011057020 A | 3/2011 |

OTHER PUBLICATIONS

English translation of First Office Action regarding related CN App. No. 2017109282524; dated Jul. 22, 2019; 8 pgs.

*Primary Examiner* — Frank B Vanaman (57) ABSTRACT

A steering column assembly includes a lower jacket, an upper jacket, a telescope actuator assembly, and an energy absorbing system. The upper jacket is at least partially received within the lower jacket. The telescope actuator assembly is arranged to translate the upper jacket relative to the lower jacket along a steering column axis. The telescope actuator assembly includes a telescope drive bracket that defines a first pathway. The energy absorbing system includes a first strap that extends at least partially through the first pathway.

17 Claims, 10 Drawing Sheets

(56) References Cited

U.S. PATENT DOCUMENTS

| | | | |
|---|---|---|---|
| 5,511,823 A * | 4/1996 | Yamaguchi | B62D 1/192 188/371 |
| 5,520,416 A | 5/1996 | Singer, III et al. | |
| 5,562,307 A * | 10/1996 | Connor | B62D 1/195 188/371 |
| 5,722,299 A | 3/1998 | Yamamoto et al. | |
| 5,848,557 A | 12/1998 | Sugiki et al. | |
| 6,142,485 A | 11/2000 | Muller et al. | |
| 6,322,103 B1 * | 11/2001 | Li | B62D 1/195 280/777 |
| 6,328,343 B1 | 12/2001 | Hosie et al. | |
| 6,439,357 B1 * | 8/2002 | Castellon | B62D 1/195 188/371 |
| 7,188,867 B2 * | 3/2007 | Gatti | B62D 1/195 280/777 |
| 7,516,991 B1 | 4/2009 | Cheng | |
| 8,935,968 B2 | 1/2015 | Sugiura | |
| 9,022,426 B2 | 5/2015 | Sakata | |
| 9,022,427 B2 | 5/2015 | Schnitzer | |
| 9,428,213 B2 | 8/2016 | Tinnin | |
| 2003/0185648 A1 | 10/2003 | Blaess | |
| 2003/0209897 A1 | 11/2003 | Manwaring et al. | |
| 2003/0227163 A1 | 12/2003 | Murakami et al. | |
| 2004/0200306 A1 | 10/2004 | Schafer | |
| 2006/0049621 A1 * | 3/2006 | Lee | B62D 1/195 280/777 |
| 2007/0137379 A1 | 6/2007 | Sanji et al. | |
| 2007/0194563 A1 | 8/2007 | Menjak et al. | |
| 2008/0106086 A1 | 5/2008 | Shimoda | |
| 2009/0200783 A1 | 8/2009 | Cymbal | |
| 2012/0125139 A1 | 5/2012 | Tinnin et al. | |
| 2012/0125140 A1 | 5/2012 | Ridgway et al. | |
| 2013/0205933 A1 | 8/2013 | Moriyama | |
| 2013/0233117 A1 | 9/2013 | Read et al. | |
| 2014/0053677 A1 * | 2/2014 | Sakata | B62D 1/195 74/493 |
| 2014/0109713 A1 | 4/2014 | Bodtker | |
| 2014/0109714 A1 | 4/2014 | Bodtker | |
| 2014/0137694 A1 | 5/2014 | Sugiura | |
| 2014/0147197 A1 | 5/2014 | Yoshida et al. | |
| 2014/0230596 A1 * | 8/2014 | Kwon | B62D 1/195 74/493 |
| 2015/0028574 A1 | 1/2015 | Meyer et al. | |
| 2015/0069747 A1 | 3/2015 | Sharman et al. | |
| 2015/0166093 A1 | 6/2015 | Moriyama et al. | |
| 2015/0232117 A1 | 8/2015 | Stinebring et al. | |
| 2015/0239490 A1 | 8/2015 | Sakata | |
| 2015/0251683 A1 | 9/2015 | Caverly et al. | |
| 2016/0046318 A1 | 2/2016 | Stinebring et al. | |
| 2016/0244015 A1 | 8/2016 | Dubay et al. | |
| 2016/0252133 A1 | 9/2016 | Caverly | |

* cited by examiner

STEERING COLUMN ENERGY ABSORBING SYSTEM

CROSS-REFERENCES TO RELATED APPLICATIONS

This patent application claims priority to U.S. Provisional Patent Application Ser. No. 62/405,339, filed Oct. 7, 2016, which is incorporated herein by reference in its entirety.

BACKGROUND

The collapsing of a steering column may absorb energy that may otherwise be transmitted to an operator of the vehicle. The features include energy absorbing devices that may plastically deform to absorb an operator's kinetic energy during a vehicle impact event. Some energy absorbing devices have fixed energy absorption performance capabilities that may not vary based on operator size, operator position relative to the steering column, vehicle speed, or impulse.

SUMMARY

According to an embodiment of the present disclosure, a steering column assembly is provided. The steering column assembly includes a lower jacket, an upper jacket, a telescope actuator assembly, and an energy absorbing system. The upper jacket is at least partially received within the lower jacket. The telescope actuator assembly is arranged to translate the upper jacket relative to the lower jacket along a steering column axis. The telescope actuator assembly includes a telescope drive bracket that defines a first pathway and a telescope actuator that is operatively coupled to the telescope drive bracket. The energy absorbing system includes a first strap having a first strap first portion connected to the upper jacket and a first strap second portion extending at least partially through the first pathway.

According to another embodiment of the present disclosure, a steering column assembly is provided. The steering column assembly includes a telescope actuator assembly and an energy absorbing system. The telescope actuator assembly is configured to translate an upper jacket relative to a lower jacket along a steering column axis. The telescope actuator assembly includes a telescope drive bracket that is coupled to the upper jacket and defines a first pathway. The energy absorbing system includes a first strap and an actuator. The first strap has a first strap first portion connected to a strap retainer disposed on the upper jacket and a first strap second portion extending at least partially through the first pathway. The actuator is disposed on at least one of the upper jacket and the telescope drive bracket and has a pin movable between an extended position and a retracted position.

These and other advantages and features will become more apparent from the following description taken in conjunction with the drawings.

BRIEF DESCRIPTION OF THE DRAWINGS

The subject matter of the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Referring now to the Figures, where the present disclosure will be described with reference to specific embodiments, without limiting the same, it is to be understood that the disclosed embodiments are merely illustrative of the present disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
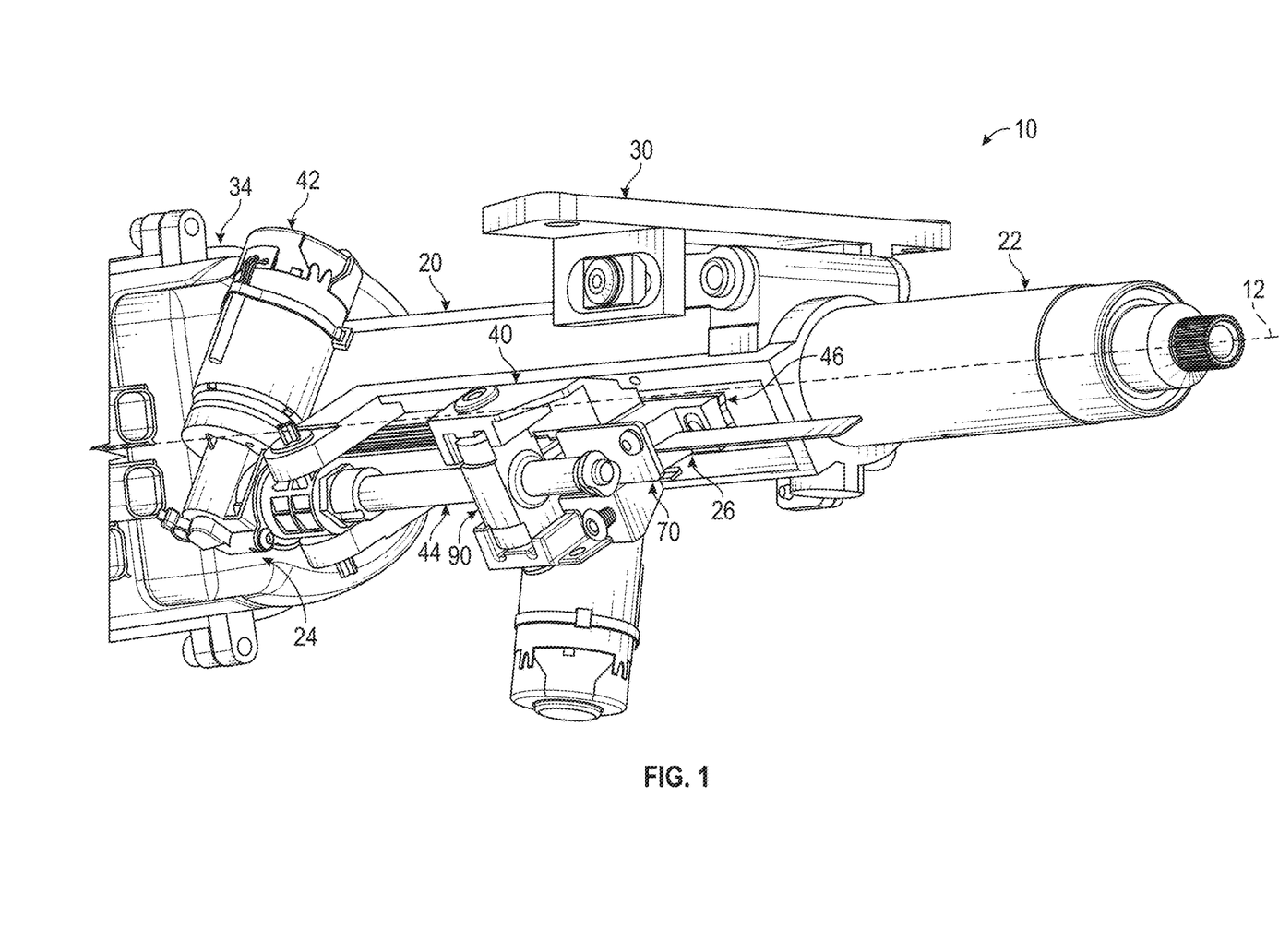
FIG. 1 is a perspective view of a steering column assembly in an extended position.

Referring to FIG. 1, a steering column assembly 10 is shown in an extended position. The steering column assembly 10 extends along a steering column axis 12. The steering column assembly 10 is a telescopic steering column assembly that may be telescopically adjustable and collapsible along the steering column axis 12.

The steering column assembly 10 includes a lower jacket 20, an upper jacket 22, a telescope actuator assembly 24, and an energy absorbing system 26.

The lower jacket 20 extends along the steering column axis 12. The lower jacket 20 defines an inner bore that slidably or telescopically receives at least a portion of the upper jacket 22. The lower jacket 20 is operatively connected to a vehicle structure by a mounting bracket 30.

Throughout this specification, the term "attach," "attachment," "connected", "coupled," "coupling," "mount," or "mounting" shall be interpreted to mean that one structural component or element is in some manner connected to or contacts another element—either directly or indirectly through at least one intervening structural element—or is integrally formed with the other structural element. Accordingly, it should be appreciated that the lower jacket 20 or the upper jacket 22 may be connected to the mounting bracket 30 in several different ways using at least one structural element interconnecting the lower jacket 20 or the upper jacket 22 and mounting bracket 30 to each other.

A steering shaft may extend through the lower jacket 20 and the upper jacket 22 and may be operatively connected to a steering actuator 34. The steering actuator 34 is commonly referred to as a "steering wheel actuator" or a "hand wheel actuator." The steering actuator 34 is configured as an electromechanical actuator that is mounted to an end of the lower jacket 20. The steering actuator 34 replaces a direct mechanical connection between the steering shaft and a steering gear that is operatively connected to a vehicle wheel with an electronic or virtual connection. The steering actuator 34 is configured to interpret a position of the steering shaft and/or a steering wheel that is connected the steering shaft to provide the position as a steering input to a steering gear that is operatively connected to a vehicle wheel to pivot the vehicle wheel.

The upper jacket 22 extends longitudinally along the steering column axis 12. The upper jacket 22 is at least partially received within the inner bore of the lower jacket 20. The lower jacket 20 and/or the upper jacket 22 are extendable, retractable, or collapsible along the steering column axis 12 with respect to each other.

The telescope actuator assembly 24 is arranged to translate the upper jacket 22 relative to the lower jacket 20 along the steering column axis 12. The telescope actuator assembly 24 includes a telescope drive bracket 40, a telescope actuator 42, and a drive member 44.

Referring to FIGS. 1-9 and 15-17, the telescope drive bracket 40 is coupled to the upper jacket 22. In at least one embodiment, the telescope drive bracket 40 is coupled to the upper jacket 22 via a mounting member 46 that defines a plurality of openings that that are sized to receive fasteners to couple various components to the upper jacket 22. The telescope drive bracket 40 and/or the mounting member 46 may extend at least partially through an elongated opening that is defined by the lower jacket 20 to enable the telescope drive bracket 40 to engage the lower jacket 20.

The telescope drive bracket 40 extends axially, relative to the steering column axis 12, between a first end 50 and a second end 52. The telescope drive bracket 40 extends circumferentially, relative to the steering column axis 12, between a first side 54 and the second side 56. The telescope drive bracket 40 includes a pair of arms 58 that extend radially, relative to the steering column axis 12, from the first side 54 and the second side 56, respectively.

The telescope drive bracket 40 defines a notch 60 and an extension 62. The notch 60 extends from the first end 50 towards the second end 52 and is disposed between the first side 54 and the second side 56. In at least one embodiment, the notch 60 extends into or towards a recessed region of the telescope drive bracket 40 that is disposed between the notch 60 and the extension 62. The extension 62 is disposed opposite the notch 60 and extends away from the second end 52. The extension 62 is arranged to receive a fastener to at least partially couple the telescope drive bracket 40 to the upper jacket 22.

The fastener may be a shear rivet that may separate the telescope drive bracket 40 from the upper jacket 22 responsive to a load that is greater than a threshold being applied to the upper jacket 22. The separation of the shear rivet and ultimately the telescope drive bracket 40 from the upper jacket 22 enables the upper jacket 22 to translate relative to the telescope drive bracket 40 and the lower jacket 20.

Figure 15:
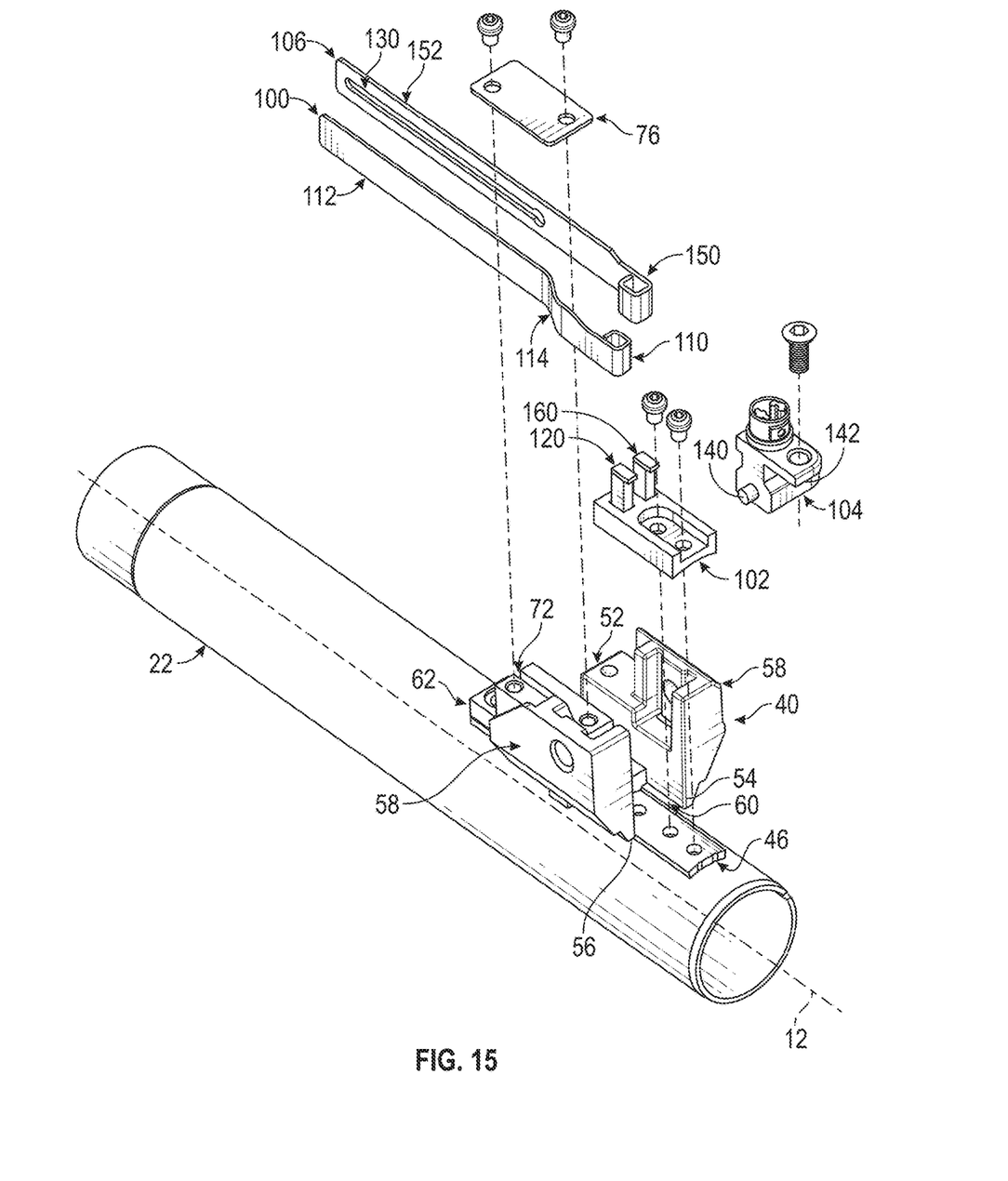
FIG. 15 is a disassembled view of a portion of the steering column assembly and an energy absorbing system having an actuator.
Figure 16:
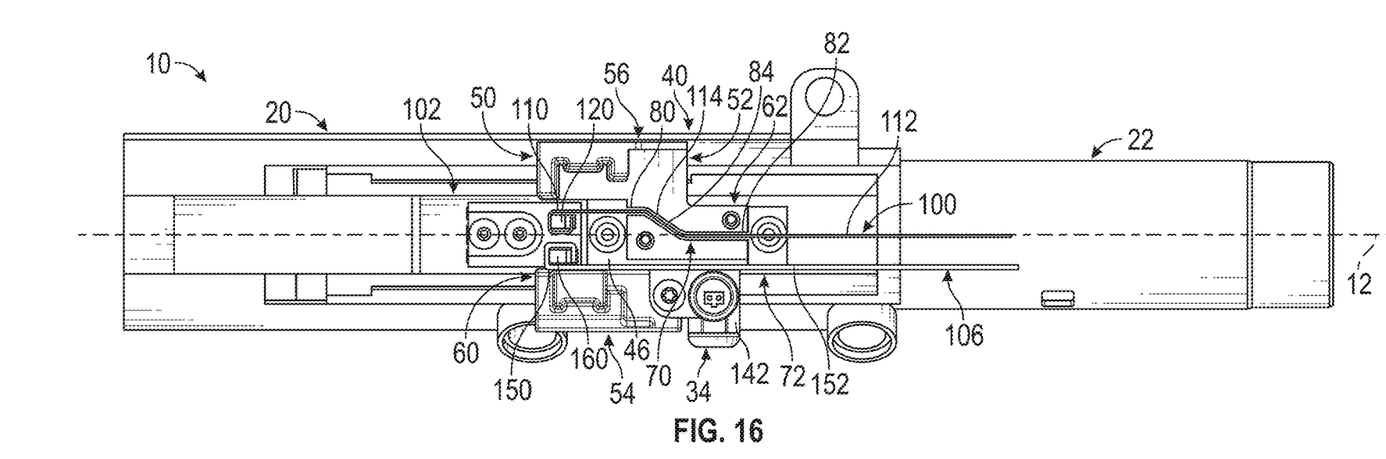
FIG. 16 is a view of a portion of the steering column assembly and the energy absorbing system in a first position and a pin of the actuator in an extended position.
Figure 17:
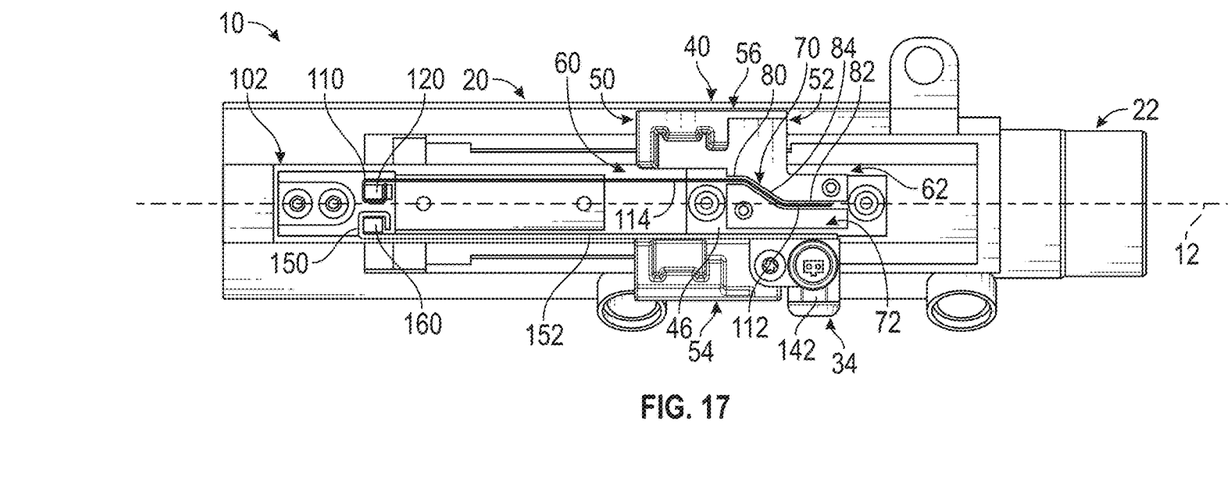
FIG. 17 is a view of a portion of the steering column assembly and the energy absorbing system in a second position and a pin of the actuator in a retracted position.

Referring to FIGS. 1-9, the telescope drive bracket 40 defines a first pathway 70. Referring to FIGS. 15-17, the telescope drive bracket 40 defines the first pathway 70 and a second pathway 72.

Referring to FIGS. 3, 4, 6-9, 16, and 17, the first pathway 70 extends between the first end 50 and the second end 52 of the telescope drive bracket 40. The first pathway 70 is configured as an elongated slot or opening that extends across the telescope drive bracket 40 between the first end 50 and the second end 52.

The first pathway 70 may have a general s-shape, z-shape, chicane shape, or generally non-linear shape. The first pathway 70 includes a first pathway first segment 80, a first pathway second segment 82, and a first pathway third segment 84.

The first pathway first segment 80 is disposed proximate the first end 50 and the notch 60. The first pathway first segment 80 extends from an end of the notch 60 towards the second end 52. The first pathway first segment 80 is disposed generally parallel to the steering column axis 12.

The first pathway second segment 82 is disposed proximate the second end 52 and extends towards the first end 50. The first pathway second segment 82 extends through at least a portion of but not completely through the extension 62. The first pathway second segment 82 is disposed generally parallel to the steering column axis 12 and is disposed generally parallel to the first pathway first segment 80. In at least one embodiment, the first pathway first segment 80 and the first pathway second segment 82 are disposed substantially parallel to each other but not coplanar with each other.

The first pathway third segment 84 extends between the first pathway first segment 80 and the first pathway second segment 82. The first pathway third segment 84 is disposed in a non-parallel relationship with the steering column axis 12 and is disposed in a non-parallel relationship with the first pathway first segment 80 and the first pathway second segment 82. The arrangement of the segments of the first pathway 70 forces an energy absorbing strap that may be received or extend through the first pathway 70 to change shape and apply friction to the energy absorbing strap that results in the generation of a load that absorbs energy as the upper jacket 22 slides through the lower jacket 20 along the steering column axis 12 during a steering column collapse event.

Figure 2:
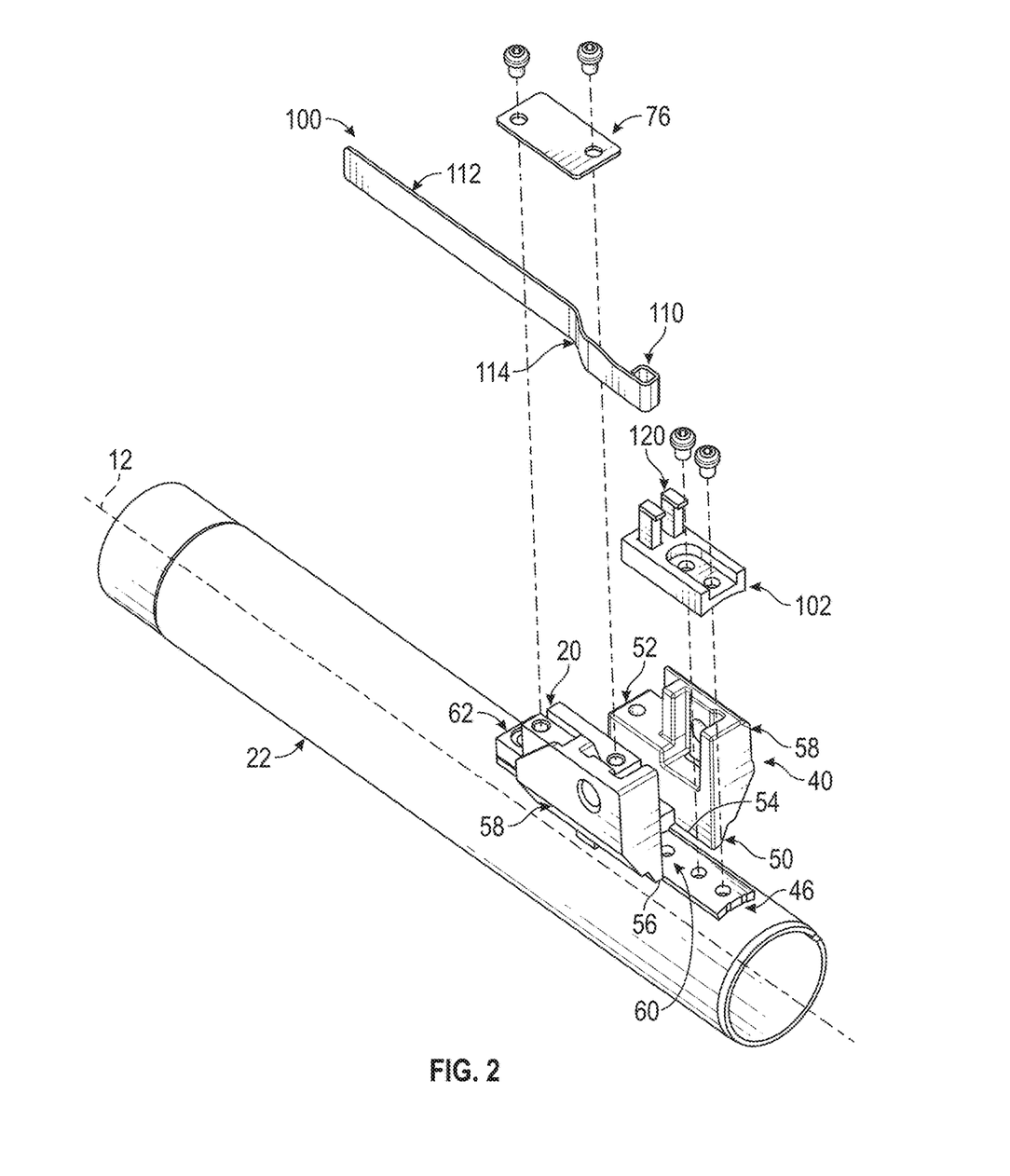
FIG. 2 is a disassembled view of a portion of the steering column assembly and an energy absorbing system.
Figure 5:
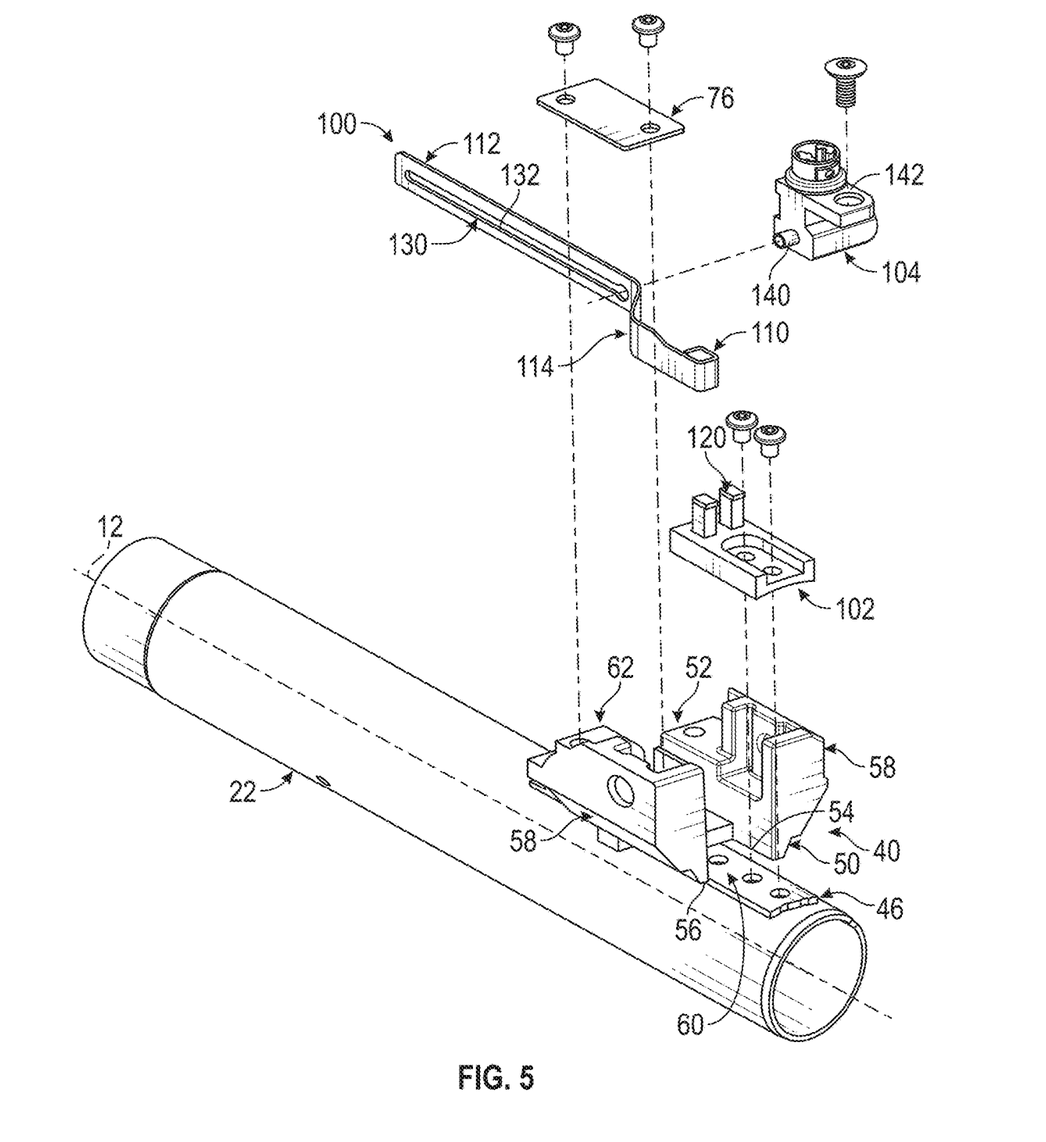
FIG. 5 is a disassembled view of a portion of the steering column assembly and an energy absorbing system having an actuator.

As shown in FIGS. 2 and 5, a cover 76 may be provided. The cover 76 may be operatively connected to the telescope drive bracket 40 and disposed over the first pathway 70. The cover 76 is arranged to retain an energy absorbing strap within the first pathway 70.

Referring to FIGS. 15-17, the first pathway 70 extends between the first end 50 and the second end 52. The first pathway 70 is disposed closer to the first side 54 than the second side 56.

The second pathway 72 is spaced apart from the first pathway 70. The second pathway 72 extends between the first end 50 and the second end 52 of the telescope drive bracket 40. The second pathway 72 is configured as an elongated slot or opening that extends across the telescope drive bracket 40 between the first end 50 and the second end 52. The second pathway 72 is disposed closer to the second side 56 than the first side 54. The second pathway 72 is disposed generally parallel to the steering column axis 12 and is disposed generally parallel to the first pathway first segment 80 and the first pathway third segment 84.

As shown in FIG. 15, the cover 76 may be operatively connected to the telescope drive bracket 40 and disposed over the first pathway 70 and the second pathway 72. The cover 76 is arranged to retain an energy absorbing strap within at least one of the first pathway 70 and the second pathway 72.

Referring back to FIG. 1, the telescope actuator 42 is spaced apart from the telescope drive bracket 40 and is disposed on the lower jacket 20. The telescope actuator 42 is drivably connected to the telescope drive bracket 40 through a drive member 44. The drive member 44 extends from the telescope actuator 42 and at least partially extends through a jackscrew nut 90 that is secured to the pair of arms 58 of the telescope drive bracket 40. The telescope actuator 42 may impart motion to the drive member 44 and the motion is converted into linear motion by the jackscrew nut 90 such that the upper jacket 22 is translated relative to the lower jacket 20 along the steering column axis 12.

The energy absorbing system 26 extends between and is operatively connected to the lower jacket 20 and the upper jacket 22. The energy absorbing system 26 is provided with at least one pull-style energy absorbing strap that is arranged to absorb kinetic energy during a steering column collapse event in which the upper jacket 22 moves or strokes from an extended position or a first position towards a retracted/collapsed position or a second position.

Referring to FIGS. 1-4, the energy absorbing system 26 includes a first strap 100 and a strap retainer 102.

Figure 3:
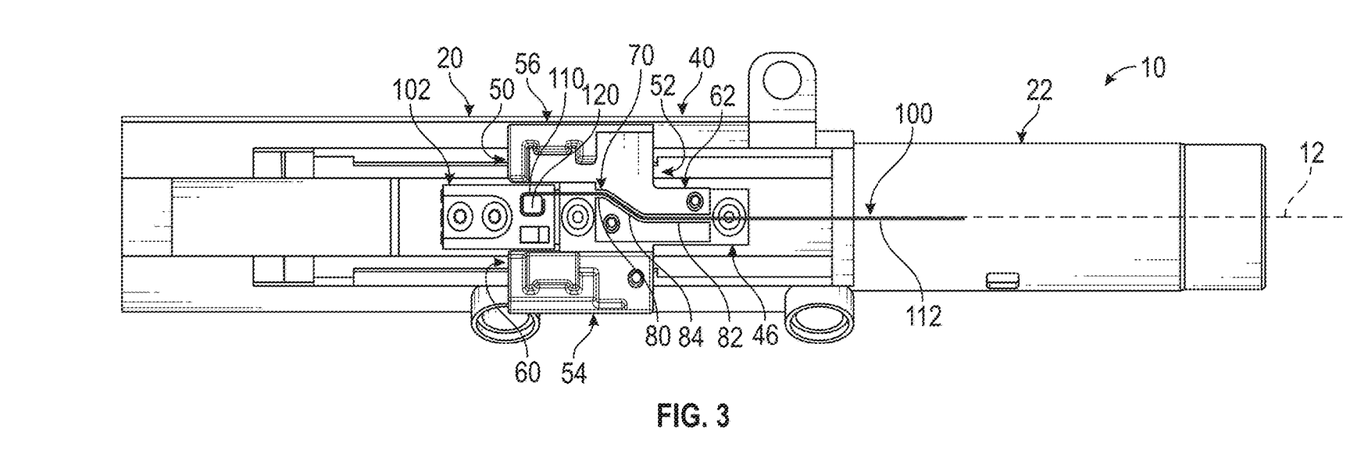
FIG. 3 is a view of a portion of the steering column assembly and the energy absorbing system in a first position.
Figure 4:
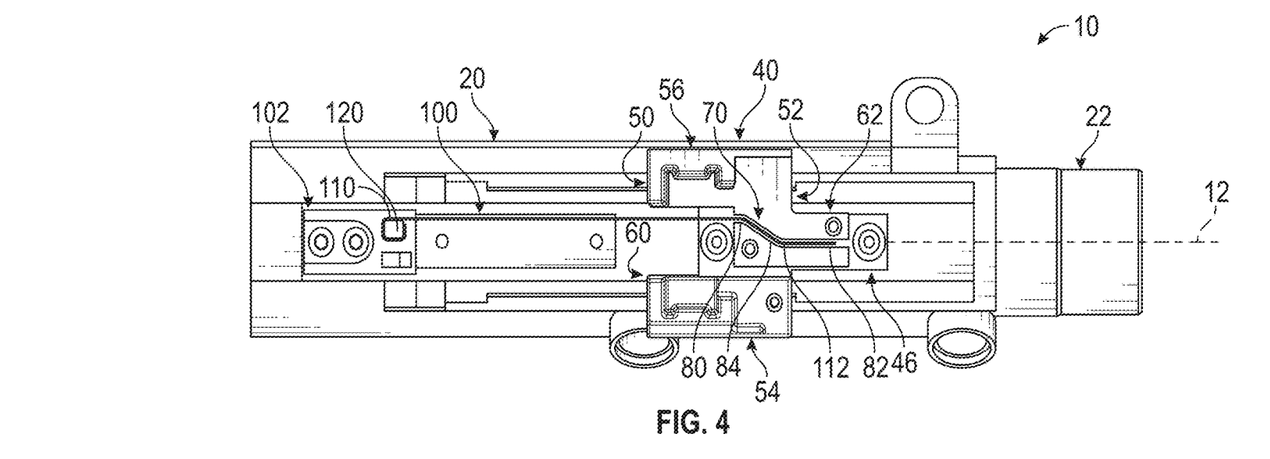
FIG. 4 is a view of a portion of the steering column assembly and energy absorbing system in a second position.

Referring to FIGS. 2-4, the first strap 100 includes a first strap first portion 110, a first strap second portion 112, and a first strap extension portion 114. The first strap first portion 110 that is connected to the upper jacket 22 through the strap retainer 102. The first strap second portion 112 extends at least partially through the first pathway 70. The first strap first portion 110 is disposed substantially parallel to but not coplanar with the first strap second portion 112. The first strap first portion 110 and the first strap second portion 112 are disposed substantially parallel to the steering column axis 12.

The first strap extension portion 114 extends between the first strap first portion 110 and the first strap second portion 112. The first strap extension portion 114 is disposed in a non-parallel and a non-perpendicular relationship to the first strap first portion 110 and the first strap second portion 112. The first strap extension portion 114 is disposed in a non-parallel and a non-perpendicular relationship to the steering column axis 12.

The strap retainer 102 is disposed on the upper jacket 22. The strap retainer 102 includes a first mounting member 120 that is arranged to secure or connect the first strap first portion 110 to the strap retainer 102. In at least one embodiment, a portion of the first strap first portion 110 is disposed about the first mounting member 120 that is configured as a post.

The strap retainer 102 is disposed adjacent to the telescope drive bracket 40 while the upper jacket 22 is in a first position. As shown in FIG. 3, the strap retainer 102 is at least partially received within the notch 60 of the telescope drive bracket 40 while the upper jacket 22 is an the first position. As shown in FIG. 4, responsive to a steering column collapse event, the upper jacket 22 moves from the first position towards a second position such that the strap retainer 102 moves away from the telescope drive bracket, thus pulling the first strap 100 such that at least one of the first strap second portion 112 and the first strap extension portion 114 translate relative to the first pathway 70 to generate a load that facilitates the energy absorbing system 26 to absorb energy as the upper jacket 22 slides through the lower jacket 20 towards the second position.

Referring to FIGS. 5-9, the energy absorbing system 26 includes the first strap 100, the strap retainer 102, and an actuator 104. The first strap 100 defines an opening 130 within the first strap second portion 112. The opening 130 may be an elongated opening that extends along a length of the first strap second portion 112. The opening 130 may have an inner surface 132 that extends along a length of the first strap second portion 112.

The actuator 104 is operatively connected to at least one of the lower jacket 20 and the telescope drive bracket 40. The actuator 104 includes a pin 140 that is movable between an extended position and a retracted position relative to an actuator body 142 that receives the pin 140.

Figure 6:
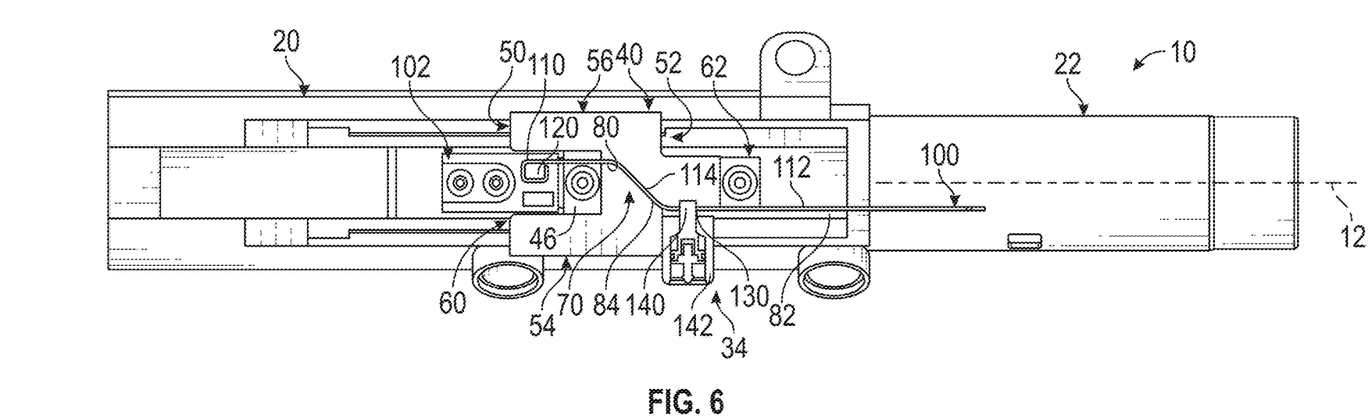
FIG. 6 is a view of a portion of the steering column assembly and the energy absorbing system in a first position and a pin of the actuator in an extended position.
Figure 7:
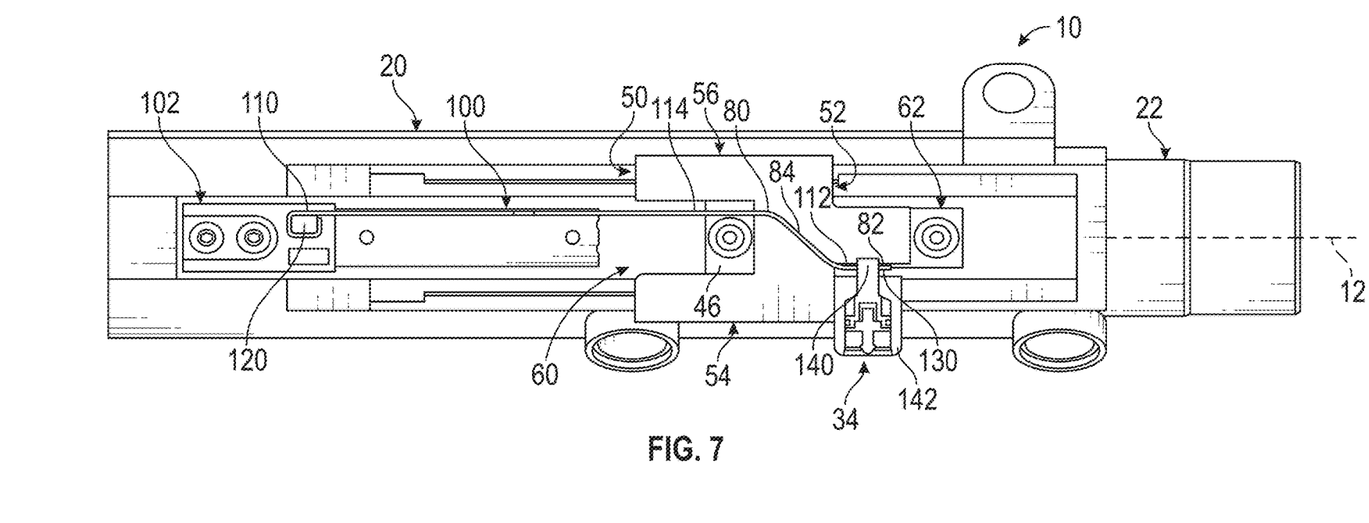
FIG. 7 is a view of a portion of the steering column assembly and the energy absorbing system in a second position and a pin of the actuator in an extended position.
Figure 8:
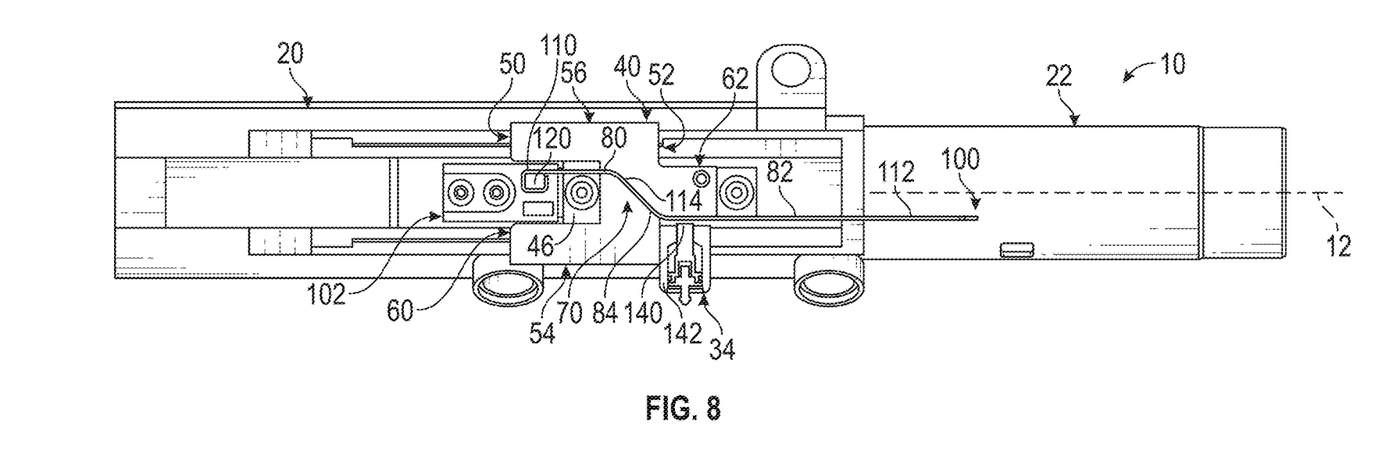
FIG. 8 is a view of a portion of the steering column assembly and the energy absorbing system in a first position and a pin of the actuator in a retracted position.
Figure 9:
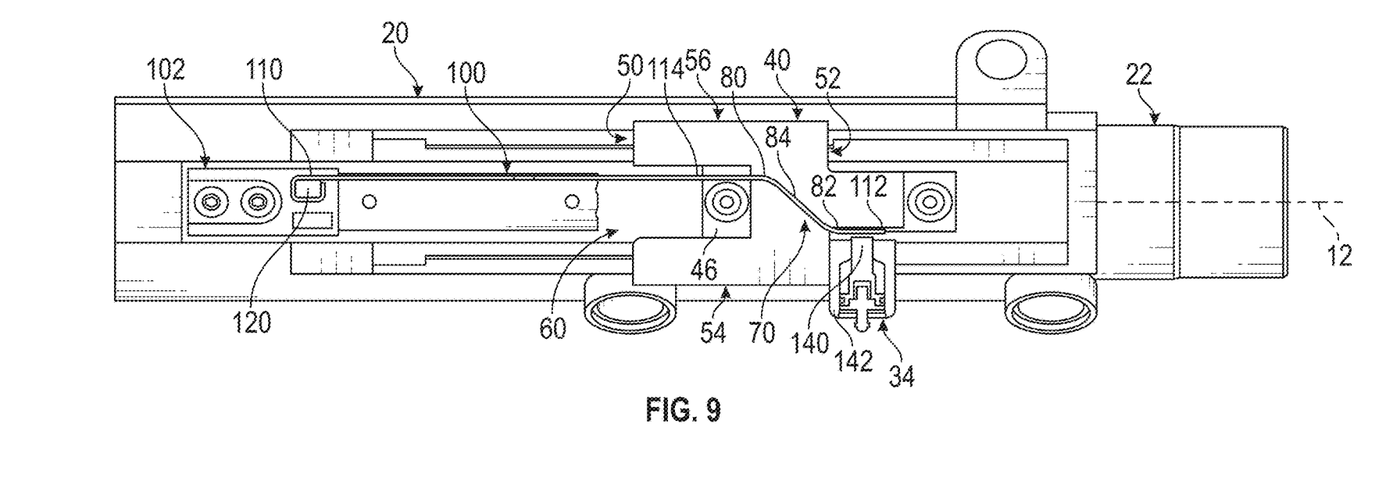
FIG. 9 is a view of a portion of the steering column assembly and the energy absorbing system in a second position and a pin of the actuator in a retracted position.

The pin 140 of the actuator 104 is in the extended position and is received within the opening 130 of the first strap 100, responsive to a steering column collapse load greater than a threshold load, as shown in FIGS. 6 and 7. The pin 140 of the actuator 104 moves from the extended position towards the retracted position such that the pin 140 is spaced apart from and is not received within the opening 130 of the first strap 100, responsive to a steering column collapse event load less than a threshold load, as shown in FIGS. 8 and 9.

The actuator 104 may include a biasing member that is disposed within a cavity defined by the actuator body 142 that is arranged to bias the pin 140 towards the extended position. The actuator biasing member may be a linear spring or the like. The actuator 104 may include a solenoid or retractable pin mechanism that is operatively connected to the pin 140.

In at least one embodiment, the actuator 104 may be a pyrotechnic actuator that includes a pyrotechnic charge disposed within a cavity defined by the actuator body 142. The pyrotechnic charge produces combustion gases that facilitate the movement of the pin 140 from the extended position towards the retracted position.

The pin 140 remains in the extended position responsive to a steering column collapse event load that is greater than a threshold load. The pin 140 rides along the inner surface 132 of the opening 130 as the first strap second portion 112 moves relative to the pin 140 while the upper jacket 22 moves from the first position towards the second position and as the first strap 100 translates relative to the first pathway 70, as shown in FIGS. 6 and 7.

The pin 140 may be oversized such that a diameter of the pin 140 is greater than a width of the opening 130. In such an arrangement, the pin 140 may act as a spreader such that frictional engagement between the pin 140 and the inner surface 132 of the opening 130 causes the opening 130 to deform, spread apart, or be widened to provide an additional load opposing stroking of the upper jacket 22.

The pin 140 is arranged to move from the extended position towards a retracted position responsive to a steering column collapse event load that is less than a threshold load. This enables the load to be primarily generated by the first strap second portion 112 translating through the first pathway 70 without an additional load being generated by the pin 140.

Referring to FIGS. 15-17, the energy absorbing system 26 includes the first strap 100, the strap retainer 102, the actuator 104, and a second strap 106.

The second strap 106 includes a second strap first portion 150 and a second strap second portion 152. The second strap first portion 150 is connected to the upper jacket 22 through the strap retainer 102. The second strap second portion 152 extends at least partially through the second pathway 72. The second strap first portion 150 is disposed substantially parallel to and coplanar with the second strap second portion 152. The second strap second portion 152 defines the opening 130.

The strap retainer 102 includes a second mounting member 160 that is spaced apart from the first mounting member 120. The second mounting member 160 is arranged to secure or connect the second strap first portion 150 to the strap retainer 102. In at least one embodiment, a portion of the second strap first portion 150 is disposed about the second mounting member 160 that is configured as a post.

The actuator 104 is operatively connected to at least one of the lower jacket 20 and the telescope drive bracket 40. The pin 140 of the actuator 104 is in the extended position and is received within the opening 130 of the second strap 106 responsive to a steering column collapse load greater than a threshold load, as shown in FIG. 16. The pin 140 rides along the inner surface 132 of the opening 130 as the second strap second portion 152 moves relative to the pin 140 while the upper jacket 22 moves from the first position towards the second position and as the second strap 106 translates relative to the second pathway 72. The combination of the pin 140 translating within the opening 130 of the second strap 106 while the second strap 106 translates within the second pathway 72 and the first strap 100 being pulled through the first pathway 70 provides an increase load to absorb energy as compared to either strap being pulled through their respective paths alone.

The pin 140 of the actuator 104 moves from the extended position towards the retracted position such that the pin 140 is spaced apart from and is not received within the opening 130 of the second strap 106, responsive to a steering column collapse event load less than a threshold load, as shown in FIG. 17.

The opening 130 of either the first strap 100 and/or the second strap 106 may be varied such that a variable drag load may be provided by the energy absorbing system 26 as the upper jacket 22 moves from the first position towards the second position during a steering column collapse event. These variations are illustrated in FIGS. 10-14.

Figure 10:
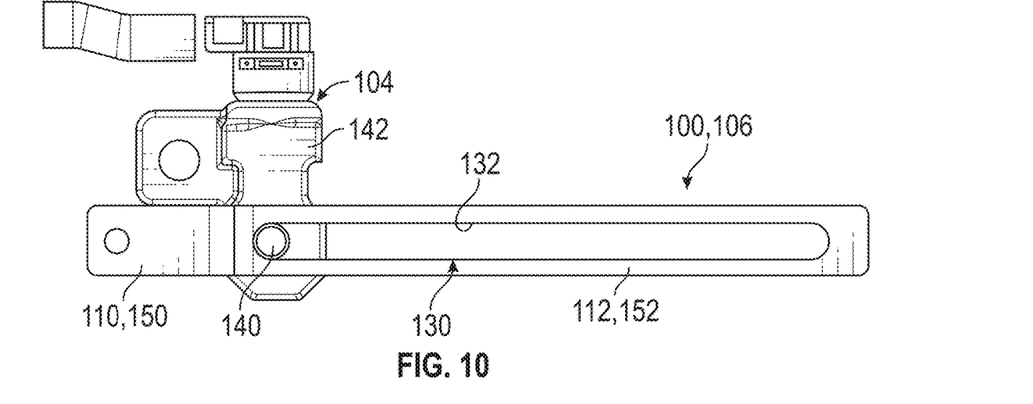
FIG. 10 is a view of a strap having an opening according to one aspect of the disclosure that is arranged to receive a portion of the actuator.

As shown in FIG. 10, the opening 130 may be a generally elongated opening having a substantially constant cross-sectional width.

Figure 11:
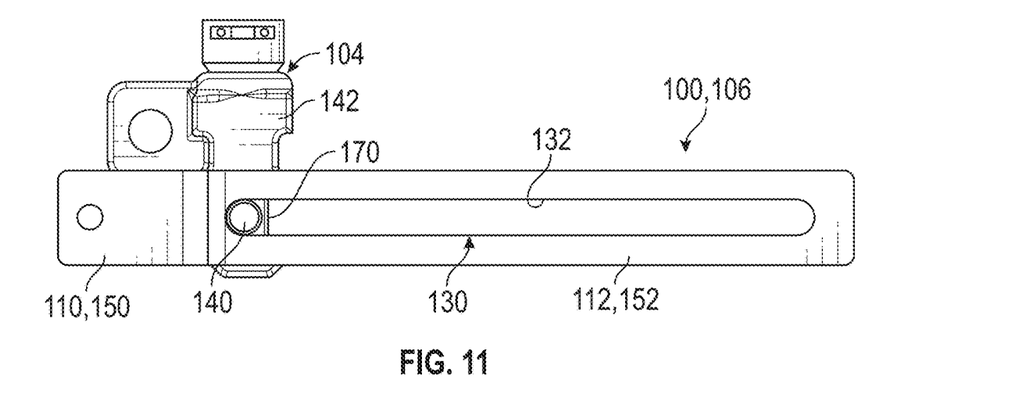
FIG. 11 is a view of a strap having an opening according to another aspect of the disclosure that is arranged to receive a portion of the actuator.

As shown in FIG. 11, the opening 130 may be a generally elongated opening having a substantially constant cross-sectional width and may include a cross rib or breakaway feature 170 that is disposed proximate an end of the opening 130. The pin 140 may be disposed between the end of the opening 130 and the breakaway feature 170 while the upper jacket 22 is in the first position.

Figure 12:
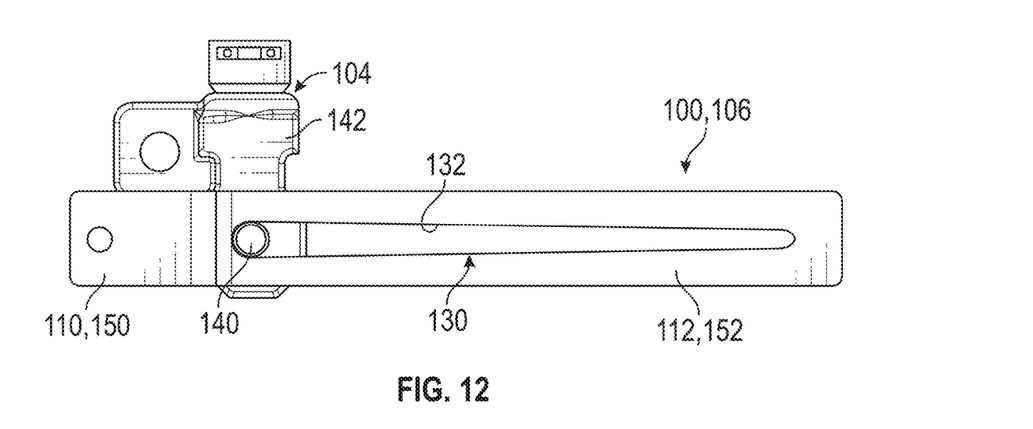
FIG. 12 is a view of a strap having an opening according to another aspect of the disclosure that is arranged to receive a portion of the actuator.

As shown in FIG. 12, the opening 130 may be a tapered slot. In the opening 130 may be tapered such that a width of the opening 130 becomes progressively smaller from a proximal end of the opening 130 towards a distal end of the opening 130. The tapered opening has a width proximate the proximal end of the opening 130 that is greater than a width proximate the distal end of the opening 130.

Figure 13:
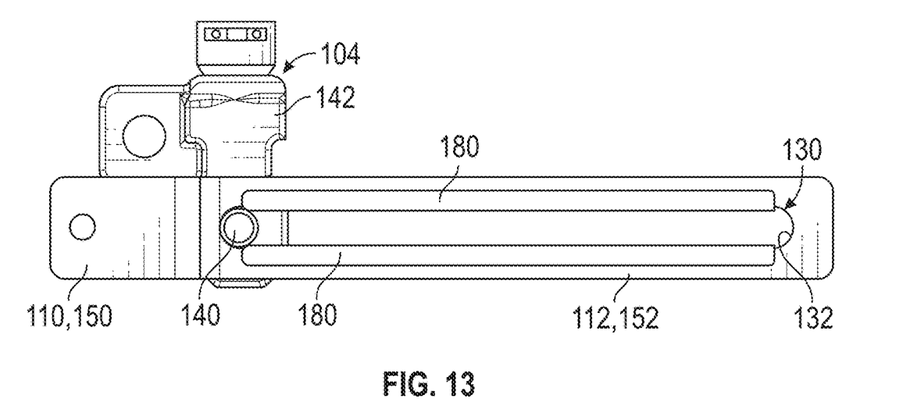
FIG. 13 is a view of a strap having an opening according to another aspect of the disclosure that is arranged to receive a portion of the actuator.

As shown in FIG. 13, the inner surface 132 of the opening 130 is lined with a friction material 180. The friction material 180 may be rubber, plastic, or the like added to the inner surface 132 of the opening 130. The friction material 180 may be pressed, snap fit, or over molded onto at least a portion of the inner surface 132 of the opening 130.

Figure 14:
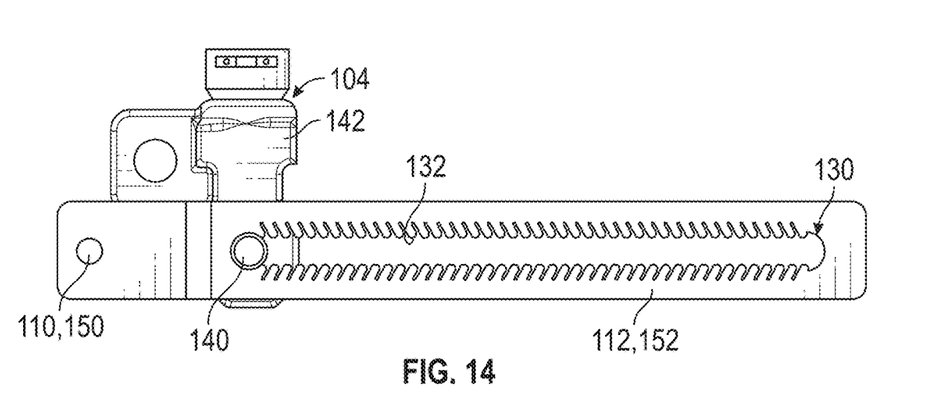
FIG. 14 is a view of a strap having an opening according to another aspect of the disclosure that is arranged to receive a portion of the actuator.

As shown in FIG. 14, the inner surface 132 of the opening 130 defines or is provided with a zipper or saw tooth configuration that may provide progressive resistance or drag.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate in scope with the present disclosure. Additionally, while various embodiments of the present disclosure have been described, it is to be understood that aspects of the present disclosure may include only some of the described embodiments or combinations of the various embodiments. Accordingly, the present disclosure is not to be seen as limited by the foregoing description.

Having thus described the present disclosure, it is claimed:

1. A steering column assembly, comprising:
   a lower jacket;
   an upper jacket that is at least partially received within the lower jacket;
   a telescope actuator assembly arranged to translate the upper jacket relative to the lower jacket along a steering column axis, the telescope actuator assembly, comprising:
     a telescope drive bracket coupled to the upper jacket, the telescope drive bracket defining a first pathway, and
     a telescope actuator disposed on the lower jacket and is operatively coupled to the telescope drive bracket; and
   an energy absorbing system, comprising:
     a first strap having a first strap first portion connected to the upper jacket and a first strap second portion extending at least partially through the first pathway, wherein the first pathway includes a first pathway first segment, a first pathway second segment, and a first pathway third segment extending between the first pathway first segment and the first pathway second segment and is disposed in a non-parallel relationship with the steering column axis.

2. The steering column assembly of claim 1, wherein the first pathway first segment and the first pathway second segment are disposed parallel to the steering column axis.

3. The steering column assembly of claim 1, wherein the first strap first portion is disposed parallel to but not coplanar with the first strap second portion.

4. The steering column assembly of claim 1, wherein the first strap first portion is operatively connected to a strap retainer that is disposed on the upper jacket.

5. The steering column assembly of claim 4, wherein the strap retainer is disposed adjacent to the telescope drive bracket while the upper jacket is in a first position.

6. The steering column assembly of claim 5, wherein responsive to a steering column collapse event, the upper jacket moves from the first position towards a second position such that the strap retainer moves away from the telescope drive bracket and the first strap second portion translates relative to the first pathway.

7. The steering column assembly of claim 5, wherein the energy absorbing system further comprises:
an actuator that is operatively connected to at least one of the lower jacket and the telescope drive bracket, the actuator having a pin movable between an extended position and a retracted position.

8. The steering column assembly of claim 7, wherein the first strap second portion of the first strap defines an opening that is arranged to receive the pin.

9. The steering column assembly of claim 8, wherein responsive to a steering column collapse event load less than a threshold, the pin moves from the extended position towards the retracted position.

10. The steering column assembly of claim 8, wherein responsive to a steering column collapse event load greater than a threshold, the pin rides along an inner surface of the opening and the second portion moves relative to the first pathway.

11. A steering column assembly, comprising:
a telescope actuator assembly configured to translate an upper jacket relative to a lower jacket along a steering column axis, the telescope actuator assembly comprising:
a telescope drive bracket coupled to the upper jacket, the telescope drive bracket defining a first pathway; and
an energy absorbing system, comprising:
a first strap having a first strap first portion connected to a strap retainer disposed on the upper jacket and a first strap second portion extending at least partially through the first pathway, and
an actuator disposed on at least one of the upper jacket and the telescope drive bracket, having a pin movable between an extended position and a retracted position, wherein the telescope drive bracket defines a notch that receives at least a portion of the strap retainer while the upper jacket is in a first position, wherein the first pathway includes a first pathway first segment disposed proximate the notch, a first pathway second segment disposed opposite the notch, and a first pathway third segment extending between the first pathway first segment and the first pathway second segment and is disposed in a non-parallel relationship with the first pathway first segment and the first pathway second segment.

12. The steering column assembly of claim 11, wherein the telescope drive bracket defines a second pathway that is spaced apart from the first pathway.

13. The steering column assembly of claim 12, wherein the second pathway is disposed parallel to the steering column axis.

14. The steering column assembly of claim 13, wherein the energy absorbing system further comprising:
a second strap having a second strap first portion connected to the strap retainer and a second strap second portion extending at least partially through the second pathway.

15. The steering column assembly of claim 14, wherein the second strap second portion defines an opening that is arranged to receive the pin.

16. The steering column assembly of claim 15, wherein responsive to a steering column collapse event load greater than a threshold, the upper jacket moves towards a second position and the pin rides along an inner surface of the opening and the first strap second portion moves relative to the first pathway and the second strap second portion moves relative to the second pathway.

17. The steering column assembly of claim 16, wherein the strap retainer is spaced apart from the notch as the upper jacket moves towards the second position.

\* \* \* \* \*